United States Patent Office 3,378,129
Patented Apr. 16, 1968

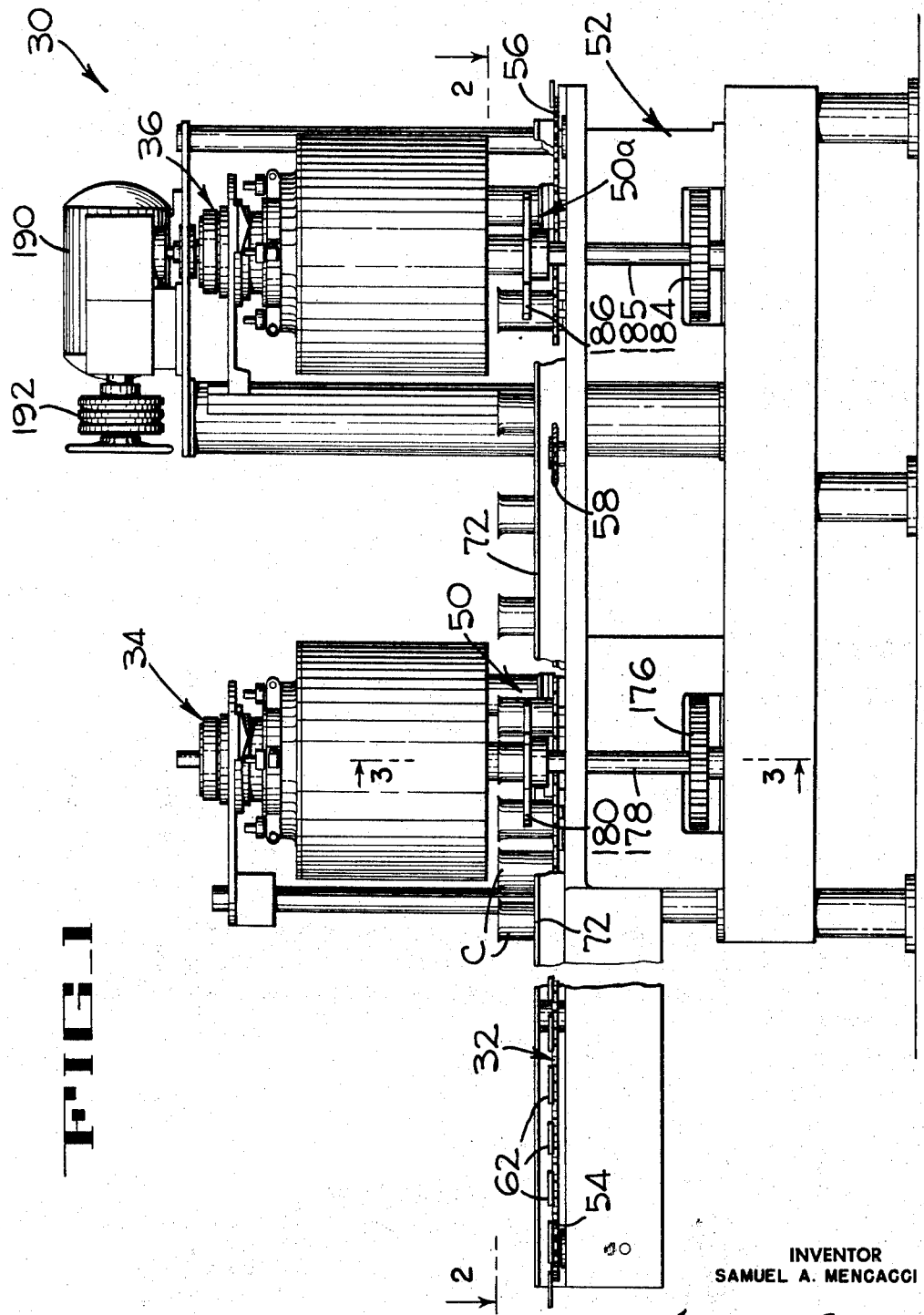

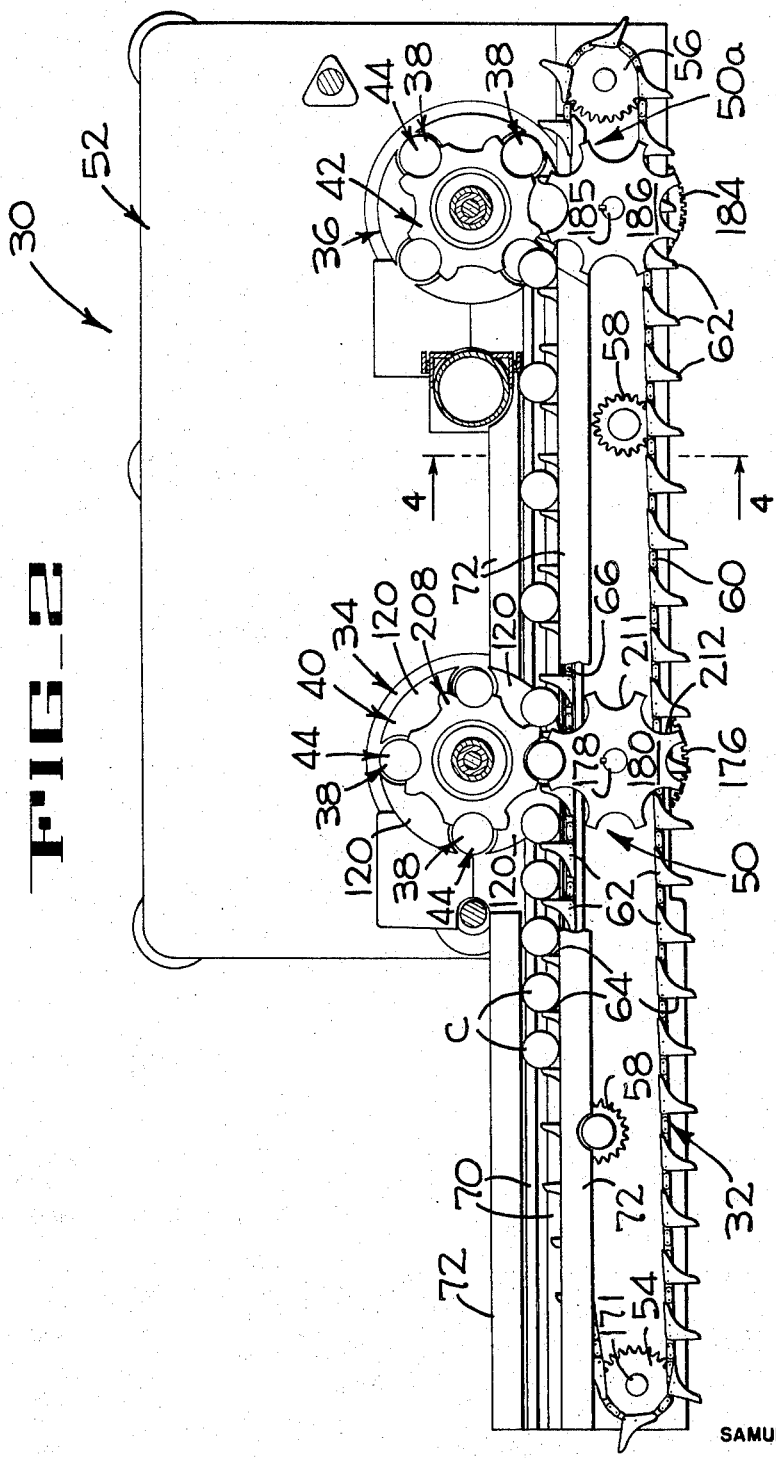

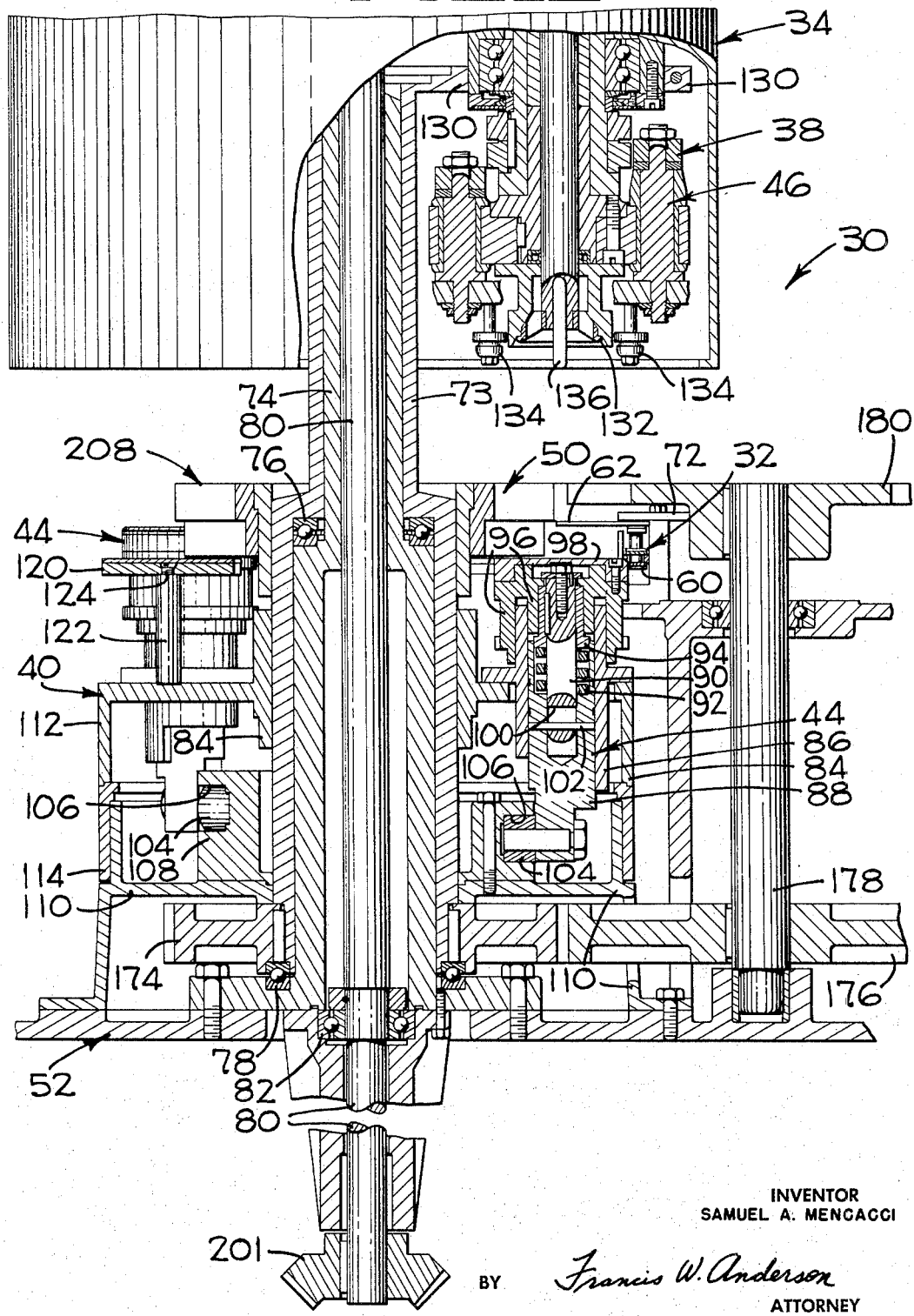

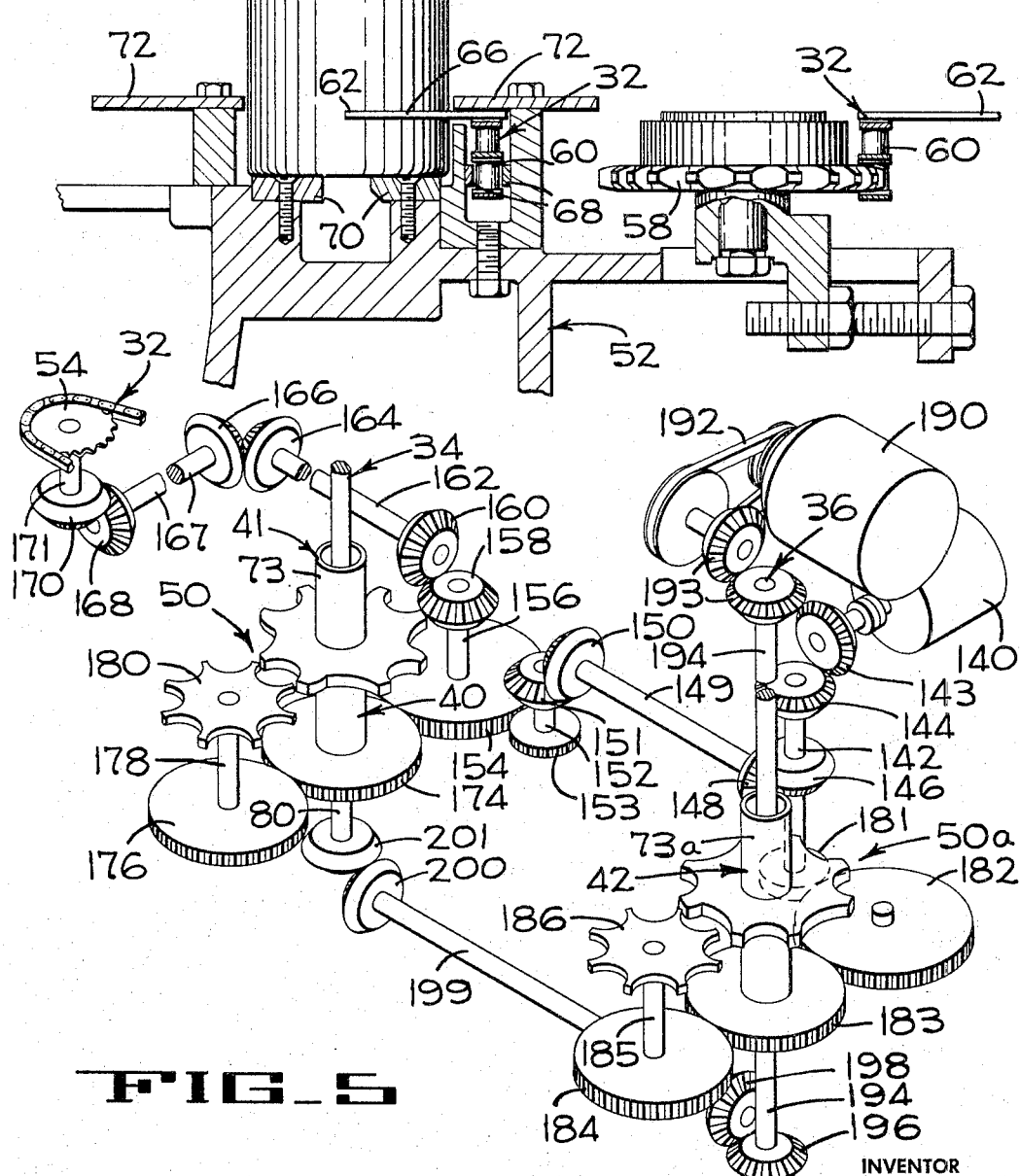

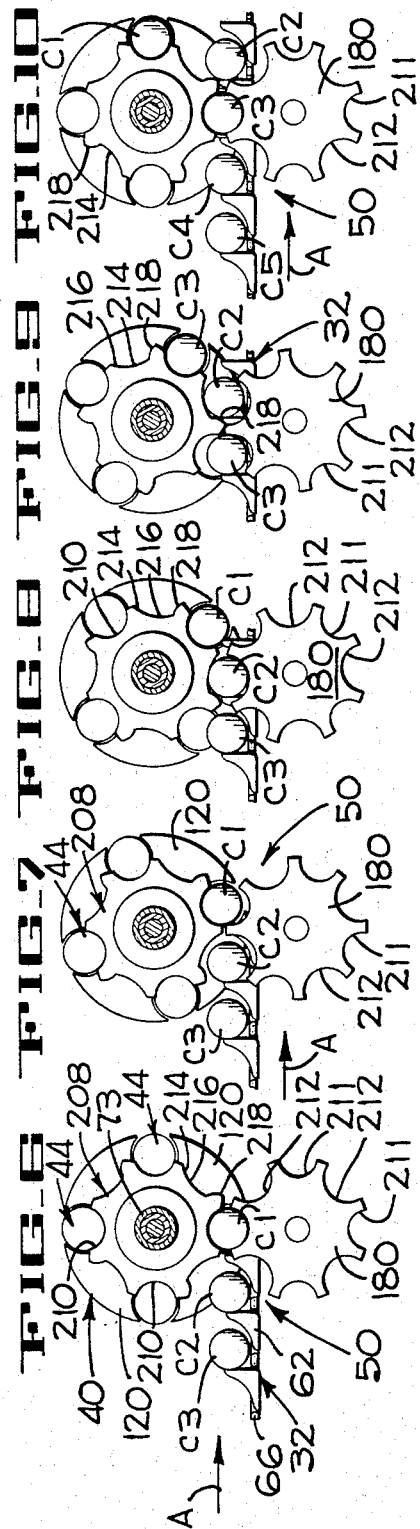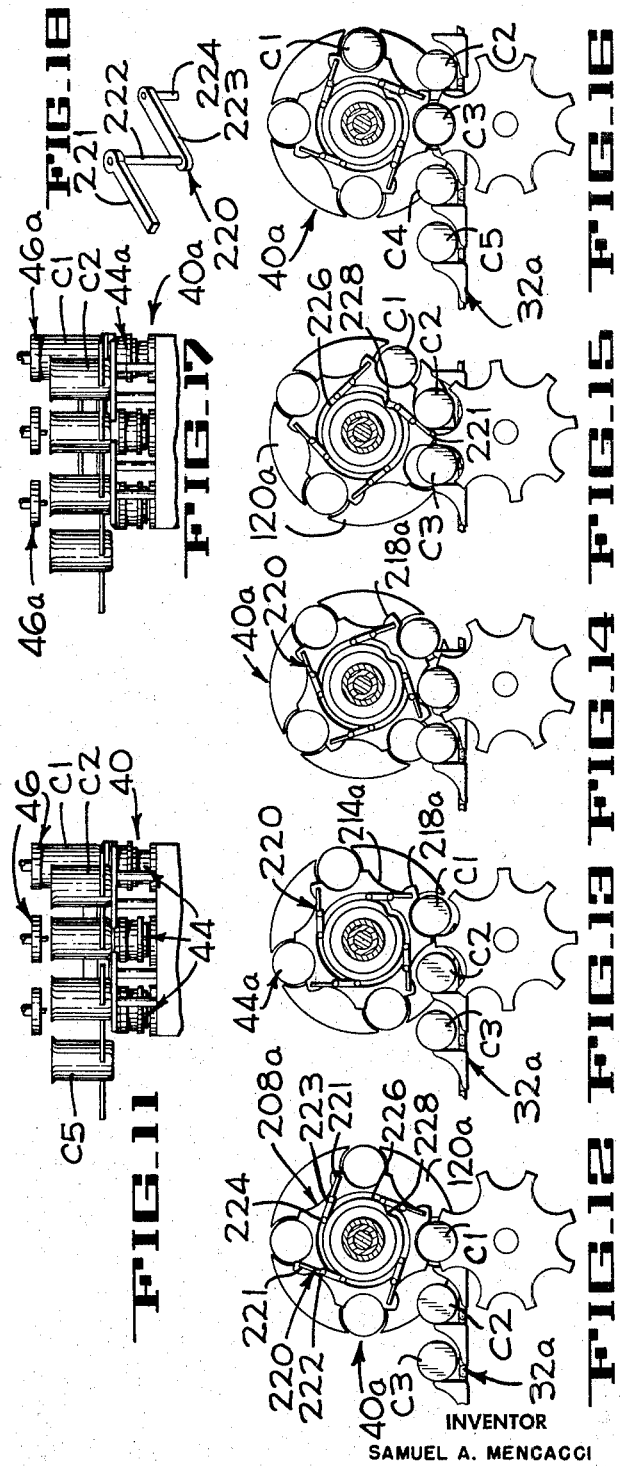

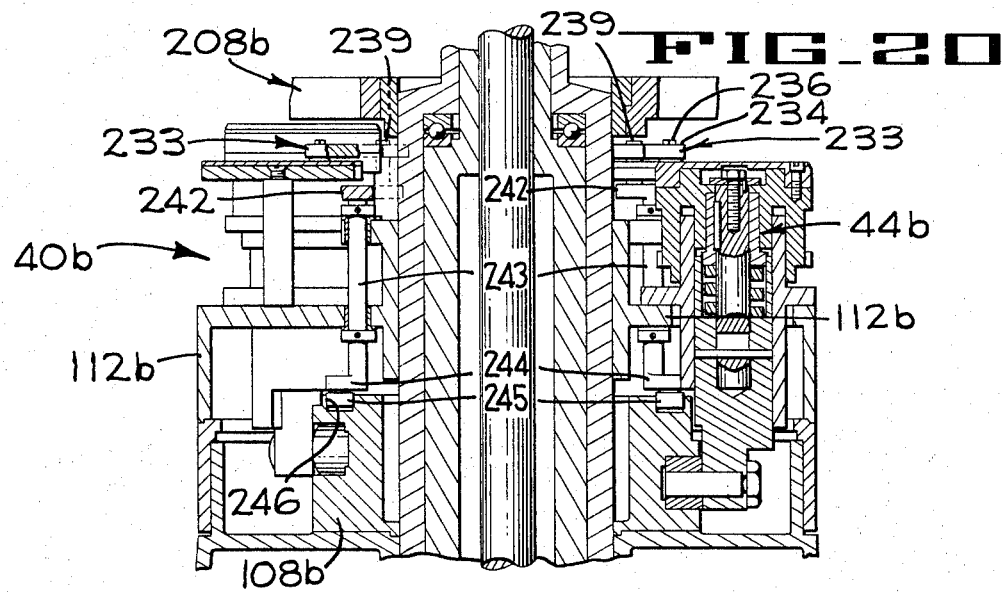
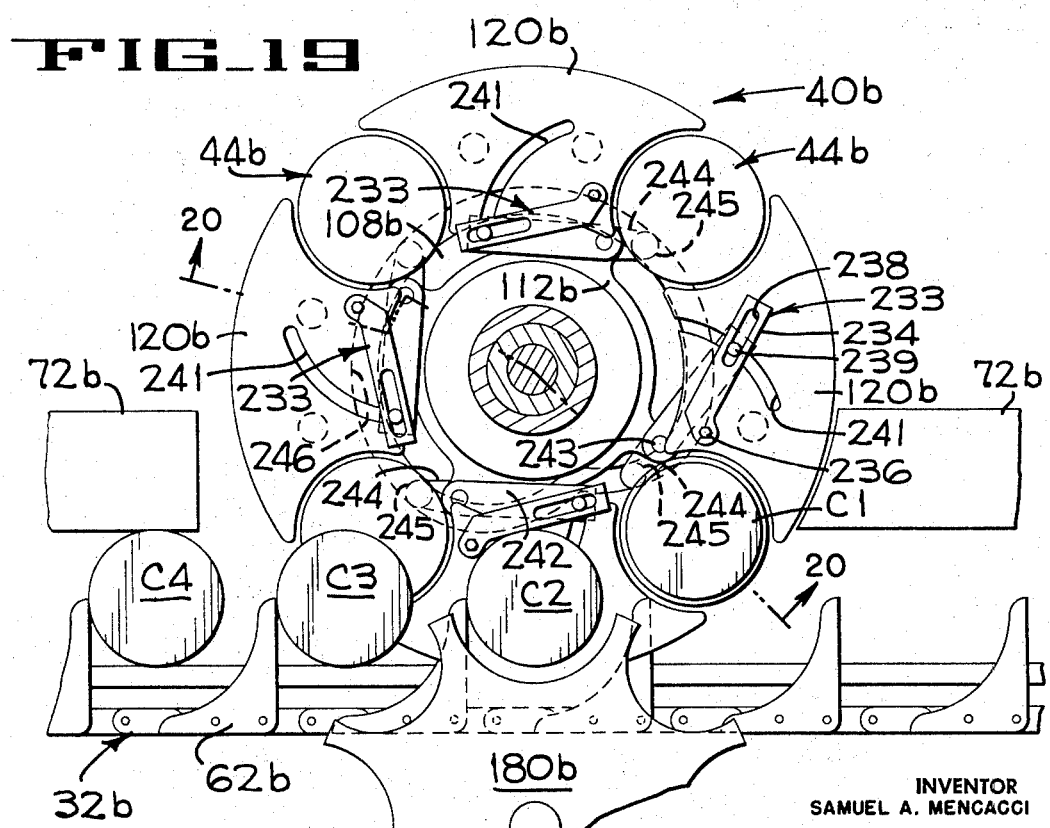

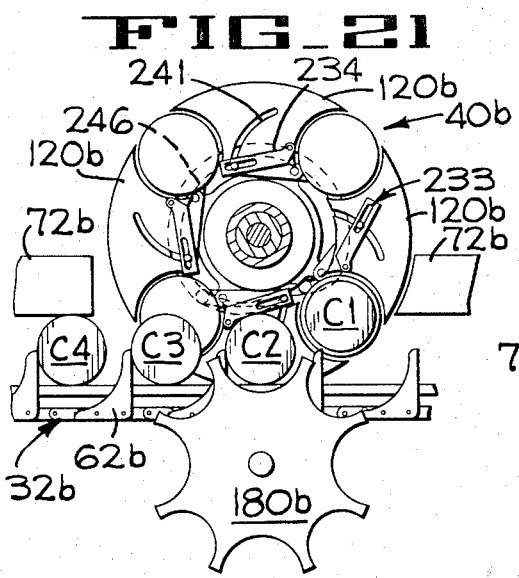
FIG_21
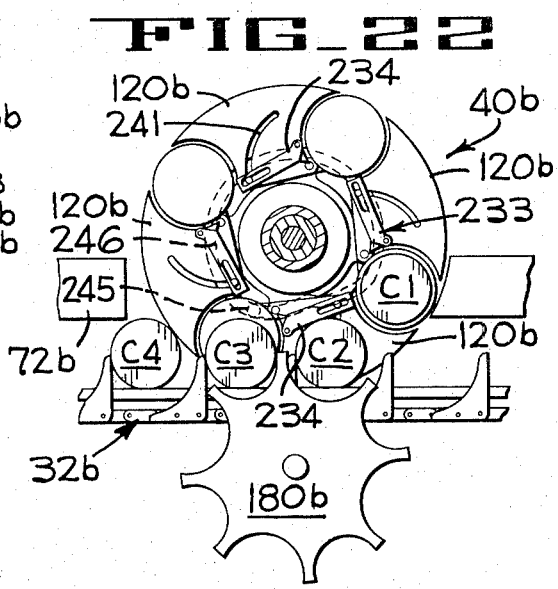
FIG_22
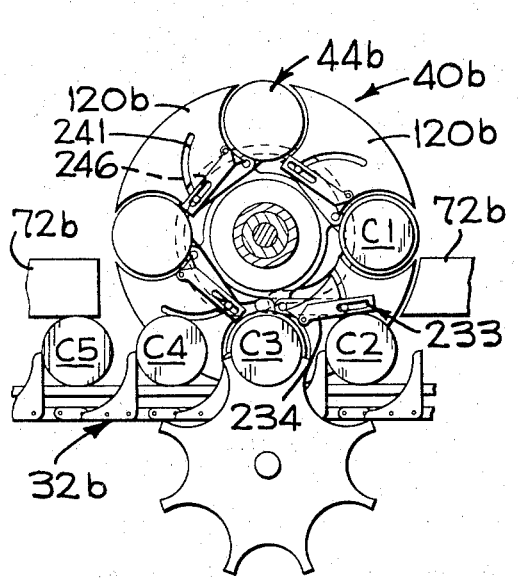
FIG_23
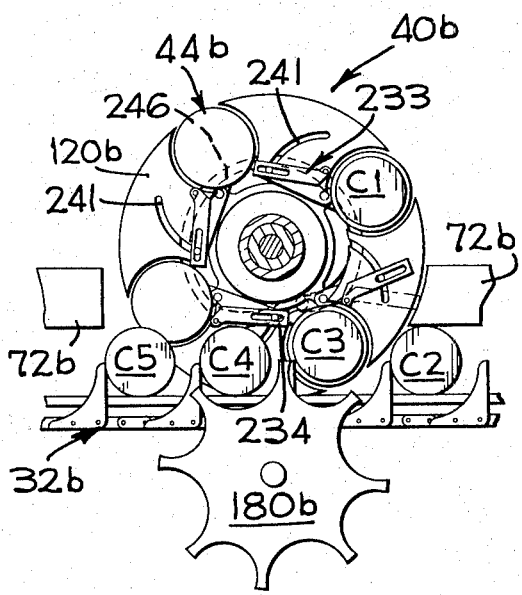
FIG_24
INVENTOR
SAMUEL A. MENCACCI
BY Francis W. Anderson
ATTORNEY

3,378,129
CONTAINER HANDLING SYSTEM
Samuel A. Mencacci, Wilrijk, Antwerp, Belgium, assignor to International Machinery Corporation, St. Niklaas-Waas, Belgium, a Belgian corporation
Filed Nov. 30, 1966, Ser. No. 598,069
10 Claims. (Cl. 198—22)

ABSTRACT OF THE DISCLOSURE

An apparatus for withdrawing selected ones of a series of containers from a linear path at a transfer station and allowing other containers to remain in the linear path and move past the transfer stations. A turret at said transfer station having a series of vertically movable carriers moving below and tangentially to the linear path and a series of abutment means moving above and tangent to the linear path whereby the carriers are moved upwardly at the point of tangency to firmly clamp the selected containers between the carriers and abutment means to positively withdraw them from the linear path. Container supporting means are disposed between the carriers, and cooperate with deflecting means carried by the turret for retaining the non-selected containers in the linear path for movement past the transfer station to other similar transfer stations.

---

The present invention pertains to container handling systems and more particularly relates to apparatus for supplying equal quantities of containers to a plurality of processing apparatus from a single linear row of rapidly moving containers.

When handling containers, hereinafter referred to as cans, although glass jars may be similarly handled, it is frequently necessary to divide one row of containers into two rows thereby changing the spacing between the containers. For example, the containers may be filled by a filler capable of handling cans spaced six inches apart whereas the next processing apparatus to handle the cans, such as a can seamer or closer, may require a minimum of 12 inch spacing between cans.

In accordance with the present invention, the above spacing problem is simply and reliably solved by placing a plurality of rotary closing machines in tandem adjacent a linear feed conveyor which advances the cans along a linear path at a constant speed and at a predetermined spacing, for example, a six inch spacing. If the closing machine is incapable of handling cans that are spaced less than 12 inches apart, two closing machines are placed in tandem and means are provided for reliably transferring alternate cans to the first closing machine and for maintaining the remaining cans on the linear conveyor for advancement to the second closing machine.

It is therefore one object of the present invention to provide an improved container handling system.

Another object is to provide a container handling system for transferring equally spaced ones of a plurality of containers that are spaced a predetermined distance apart from a linear run of a conveyor to a first processing apparatus, and for maintaining the remaining containers on said linear conveyor for acceptance by other processing apparatus.

Another object is to provide a container dividing mechanism, which mechanism constitutes a part of a closing machine turret.

Another object is to provide a container dividing mechanism which constitutes part of a closing machine turret and which includes means for clamping alternate containers in said turret.

Another object is to provide a container dividing mechanism for reliably transferring alternate containers moving along a linear path into the pair of tandem spaced closing machines.

These and other objects and advantages of the present invention will become apparent from the following description and the accompanying drawings, in which:

FIGURE 1 is a side elevation of the can handling system of the present invention, certain parts being cut away.

FIGURE 2 is a horizontal section of the apparatus of FIGURE 1 taken along lines 2—2 of FIGURE 1 and illustrating a first embodiment of the can transfer mechanism.

FIGURE 3 is an enlarged section taken substantially along lines 3—3 of FIGURE 1 with parts cut away, and illustrating the can transfer mechanism of FIGURE 2 associated with portions of a can closing machine.

FIGURE 4 is an enlarged section taken along lines 4—4 of FIGURE 2 illustrating a portion of the feed conveyor and associated can track.

FIGURE 5 is a diagrammatic perspective with parts broken away illustrating the drive for the container handling system of the present invention.

FIGURES 6 to 10 are diagrammatic operational views in plan illustrating progressive steps in the operation of the embodiment of the transfer mechanism illustrated in FIGURES 2 and 3.

FIGURE 11 is an operational end elevation view illustrating the manner in which the cans enter the first closing machine with alternate cans subsequently being lifted upwardly into clamping engagement with the closing head.

FIGURES 12 to 16 are diagrammatic operational views in plan of a second embodiment of the transfer mechanism.

FIGURE 17 is a side elevation of the mechanism illustrated in FIGURES 12 to 16.

FIGURE 18 is an enlarged perspective of one of the can deflecting fingers of the second embodiment of the invention.

FIGURE 19 is a plan of a third embodiment of a transfer mechanism.

FIGURE 20 is a vertical section taken along lines 20—20 of FIGURE 19.

FIGURES 21 to 24 are operational views in plan illustrating the apparatus of the third embodiment of the invention.

The container handling system 30 (FIGS. 1 and 2) of the present invention in general comprises an end-less feed conveyor 32 which moves filled cans C along a linear path at the rate of approximately 400 cans per minute. A first can closing machine 34 and a second can closing machine 36 are mounted in tandem adjacent the linear path of movement of the cans. Each can closing machine 34, 36 includes four equally spaced seaming head assemblies 38 (only one head being shown in FIG. 3) mounted on turrets 40 and 42, respectively. Each seaming head asembly 38 includes a can lifting mechanism 44 with a seaming head 46 disposed thereabove and concentric therewith.

A can dividing mechanism 50 is associated with and constitutes a part of the first closing machine 34 and a similar mechanism 50a (FIG. 2) may be provided for the machine 36 if desired. It will be understood, that the mechanism 50a is not essential unless the cans advanced by the conveyor 32 are to be divided into more than two separate groups. The mechanism 50 is effective to transfer alternate ones of the cans from the conveyor 32 onto the associated can lifting mechanism 44 which lifts the cans upwardly and clamps them against the seaming heads 46 for sealing in a well known manner. The can dividing mechanism also includes means for retaining the remaining cans in the linear path of movement of the conveyor 32.

More particularly, the container handling system 30 (FIGS. 1–5) comprises a frame 52 which has a conveyor drive sprocket 54, a driven sprocket 56 and an idler sprocket 58 journaled thereon. The endless feed conveyor 32 includes a horizontally disposed chain 60 having a plurality of evenly spaced pushers 62 provided with can contacting surfaces 64 which project outwardly from and are normal to a linear can dividing run 66 of the conveyor. As illustrated in FIGURE 4, when the pushers 62 are moving cans C along the can dividing run 66, the main 60 is maintained horizontal by guide rods 68 secured to the frame, and the cans are slidably supported on rails 70 bolted to the frame. The cans are also retained from lateral deflection from a portion of the can dividing run 66 of the conveyor by guide rails 72. It will be apparent from FIGURE 2 that the support rails 70 and the guide rails 72 adjacent the can closing machines are cut away immediately adjacent the turrets 40 and 42 thereof as to cause can supporting elements of the turrets to rotate in tangential relationship with the center of the path of movement of the containers when being advanced along the can dividing run 66.

The first can closing machine 34 which has the can dividing mechanism 50 incorporated therein comprises the turret 40 (FIG. 3) which includes a rotatable tubular column 73 that is journaled on a stationary tubular column 74 by bearings 76 and 78. The stationary column 74 is bolted to the frame 52 and has a seaming head actuating shaft 80 mounted for rotation therein by a bearing 82. The rotary column 73 of the turret 40 has a lower tool supporting hub 84 rigidly secured thereto, which hub is provided with four equally spaced apertures, each of which receives a tubular housing 86 of the associated can lifting mechanism 44.

Each housing slidably receives a vertically extending push rod 88 which is bored and counterbored to slidably receive a plunger 90 and a compression spring 92. A spring retainer 94, upper guide 96, and can supporting press plate 98 are rigidly secured as an assembly to the plunger 90 by bolts as clearly indicated in FIGURE 3. The lower end of the plunger 90 is provided with a vertical slot 100 through which is inserted a pin 102 which is anchored in holes in the push rod 88. Thus, when the push rod 88 is moved upwardly thereby forcing a can against the seaming head 46, the spring 92 will serve to resiliently clamp the can against the associated seaming head.

In order to vertically reciprocate the push rod 88 of each can lifting mechanism 44, a cam follower 104 is journaled on the lower end of the push rod 88 and is received in a vertically undulating cam groove 106 of a stationary cam 108. The cam 108 is bolted to a bracket 110 which is, in turn, bolted to the frame 52. As indicated in FIGURE 3, the tool supporting hub 84 has a skirt 112 projecting downwardly therefrom and has a large diameter ring 114 secured to its lower end so as to provide a housing to prevent inadvertent entry into the area surrounding the cam 108.

As illustrated in FIGURES 2 and 3, four arcuate can supporting segments 120 are positioned between the four can lifting mechanisms 44. The segments 120 are each supported by the lower tool supporting hub 84 from two vertically extending pedestals 122 (only one being shown in FIGURE 3) and associated screws 124. The pedestals support the segments 120 at the same height as the can supporting rails 70 so that alternate cans being advanced by the conveyor 32 will first slide onto the associated segment 120 and, after moving past the first can closing machine 34 will be deflected from the segment by the can dividing mechanism 50 for acceptance by the portions of the rails 70 disposed downstream of the first can closing machine 34.

If cans are the particular type of containers being handled by the closing machine, any suitable seaming head may be utilized for seaming the cover on the can. The seaming head 46 illustrated in FIGURE 3 is of well known design and may be employed for such operation. Each head is mounted above and in axial alignment with the associated lifting mechanism 44 and is supported for rotary movement by an upper tool supporting plate 130 from the rotary column 73.

Since the particular construction of each seaming head 46 forms no part of the present invention, the head will not be described in detail. It will be sufficient to say that each seaming head includes a generally tubular can cover abutment member 132 which is rotated by the turret about the axis of the rotary column 73. The abutment member 132 is non-rotatable relative to the can lifting mechanism 44 disposed therebelow and serves as means against which each can is clamped upon upward movement of the lifting mechanism 44 to thereby firmly grip the can between the abutment member 132 and lifting mechanism 44 permitting transfer of the same from the linear path of the can dividing run 66 of conveyor 32.

While so clamped against the abutment member 132, the can covers are seamed onto the cans in the usual manner as by pivoting seaming rollers 134 through slots (not shown) in the abutment member 132 and forcibly urging the seaming rollers 134 against the edge of the can cover while rotating the rollers therearound to seal the cover to the can. Upon completion of the seaming operation the rollers 134 are cammed away from the can and a knock out rod 136 which is resiliently urged downwardly by a spring (not shown) is cammed downwardly to dislodge a can from the abutment member 132, all as well known in the art.

The drive train for the turrets 40 and 42, the conveyor 32, and the can dividing mechanisms 50 and 50a is best illustrated in FIGURE 5 and is powered by a motor 140. The motor 140 drives a vertical shaft 142 through bevel gears 143 and 144. A bevel gear 146 keyed to the shaft 142 meshes with a bevel gear 148 keyed to one end of a horizontal shaft 149. A bevel gear 150 on the other end of the shaft 149 drives a similar gear 151 of an idler shaft 152 having a pinion 153 keyed to its lower end. The pinion 153 meshes with a large diameter gear 154 which is keyed to a stub shaft 156 and has a bevel gear 158 rigid with its upper end. The bevel gear 158 meshes with a single bevel gear 160 keyed to one end of a shaft 162 which has a bevel gear 164 on its other end. The bevel gear 164 meshes with a bevel gear 166 on one end of a cross shaft 167 which has a bevel gear 168 on its other end. This last mentioned gear meshes with a bevel gear 170 keyed to conveyor drive shaft 171 having conveyor sprocket 54 keyed to its upper end thereby driving the conveyor 32.

The turret 40 and the can dividing mechanism 50 associated therewith is driven from the gear 154 which meshes with a gear 174 that is keyed to the rotatable tubular column 73 of turret 40. The gear 174 meshes with a gear 176 keyed to the lower end of a shaft 178 that has a star wheel 180 of the can dividing mechanism 50 keyed to its upper end. Thus, the turret 40 and can dividing mechanism 50 is driven in timed relation with the conveyor 32.

The turret 36 and can dividing mechanism 50a is driven from the shaft 142 which has a pinion 181 keyed to its lower end. The pinion 181 meshes with a gear 182, which in turn, meshes with a gear 183 that is keyed to a rotatable column 73a of the turret 36. The gear 183 meshes with a gear 184 that is keyed to the lower end of a shaft 185 that has a star wheel 186 of the can dividing mechanism 50a keyed to its upper end.

In order to drive the seaming rollers 134 (FIG. 3) and other portions of the seaming heads 46 of each closing machine 34 and 36, a separate motor 190 (FIG. 5) is provided. The motor 190 is connected by a belt drive 192 and gear drive 193 to a shaft 194 that is concentric with and extends through the vertical rotatable column 73a of the turret 42. A bevel gear 196 on the lower end of the shaft 194 meshes with a bevel gear 198 keyed to one end of a horizontal shaft 199 having a bevel gear 200 keyed to the other end of the shaft 199. A bevel gear 201 is keyed to the lower end of shaft 80 which is concentric with and is disposed within the rotatable column 73 of the turret 40. The movable parts of the seaming heads 46 associated with turret 40 are operatively connected to the shaft 80, while the movable parts of the seaming heads 46 associated with the turret 42 are operably connected to the shaft 194 by means not shown.

As best shown in FIGURES 6 to 10, the can dividing mechanism 50 of the first embodiment of the invention includes the aforementioned star wheel 180 which is driven as above described in timed relation with the turret 40 and conveyor 32 to advance cans C1, C2, C3, C4 and C5 in the direction indicated by arrows A. The can dividing mechanism 50 also includes a can dividing wheel 208 that is rigidly secured to the rotatable column 73 and includes four evenly spaced generally semi-circular pockets 210 of substantially the same diameter as the cans. The pockets 210 cooperate with four equally spaced semi-circular pockets 211 of a similar size which are formed in the star wheel 180 and engage and advance the odd numbered cans C1, C3 and C5 along a curved path defined by the turret 40.

In this regard, the conveyor 32 advances each odd numbered can onto one of the can lifting mechanisms 44 (FIG. 11) which engages and lifts the cans upwardly into clamped engagement with the associated seaming head 46 disposed thereabove. Each seaming head and can lifting mechanism cooperates to normally clamp the associated can and cover to the turret when the can reaches the approximate position illustrated by the can C1 in FIGURE 7. Thus, alternate cans, as indicated by odd numbered cans in FIGURES 6 to 10, are firmly clamped to the turret, and are moved therewith around a curved path away from the other even numbered cans which continue their movement along a linear path. The covers are seamed onto the odd numbered cans when the cans are moving in the curved path defined by the turret 40. After the odd numbered cans have the covers seamed thereon, they are released from the turret 40 and discharged therefrom by any suitable discharge conveyor (not shown).

The remaining cans, i.e., the evenly numbered cans as indicated by can C2, are advanced by the conveyor 32 onto associated ones of the can supporting segments 120. The can C2 is moved into one of four large diameter star wheel pockets 212 which are disposed between the small can size pockets 211 of the star wheel 180. Four equally spaced compound curved pockets 214 of the can dividing wheel 208 are interposed between the pockets 210 and cooperate with the pockets 212 and pushers 62 of the conveyor 32 to retain the cans C2 and the other evenly numbered cans in the linear path of movement of the can dividing run 66 of the conveyor 32.

As indicated progressively in FIGURES 6-10, the compound curved pockets 214 each includes a concave lead-in portion 216, which as indicated in FIGURE 8, maintains the can C2 in its linear path until after the can C2 has moved past the point of tangency of the can dividing wheel 208 and the star wheel 180. At this time, a convex surface 218 of the associated compound curved pocket 214 engages the can C2 and, because of its convex curvature, exerts a component of force against the can C2 which urges the can away from the center of the turret 40 thereby moving the can C2 off the arcuate segment 120 for continued advancement by the associated pusher 62 of the conveyor 32 along a linear path to the second turret 42. All other cans corresponding to the evenly numbered cans C2 and C4 are moved by the conveyor 32 to turret 42 for sealing thereby.

Although the container handling system in the drawings is arranged to divide the cans into only two groups, it will be understood that the system can be easily altered to divide the cans into three or more groups if desired by utilizing star wheels and can dividing wheels 208 on all but the last seaming turret, and by increasing the number of turret by-passing pockets 212, 214 in the can dividing wheels and star wheels while retaining the same number of transfer pockets 210, 211.

In FIGURES 12-18 a second embodiment of the invention is illustrated which is identical to the first embodiment of the invention except that cam actuated fingers 220 are provided to aid in forcing the turret by-pasing cans C2 and C4 off the can suporting segments 120a and into the linear path of movement of the conveyor 32a. Accordingly, only the fingers 220 and means for actuating the same will be described in detail and the same numerals followed by the letter "a" will be used in the second embodiment of the invention to define parts which are equivalent to those described in the first embodiment of the invention.

It will be understood that the odd numbered cans are deflected onto the turret 40a (FIG. 17) and are clamped between the associated can lifting mechanism 44a and seaming heads 46a.

Each finger 220 (FIG. 18) comprises a can contacting member 221 that is disposed above the can dividing wheel 208a and is rigidly secured to the upper end of a pivot shaft 222 that extends through and is journalled in the wheel 208a. An actuating arm 223 is rigidly secured to the lower end of the pivot shaft and has a cam follower 224 on its free end disposed within a cam groove 226. The cam groove may be formed in the upper surface of the stationary cam 108 (FIG. 3) and serves to hold the can contacting member 221 in inactive position except during the time the can C2 is moving from the position illustrated in FIGURE 15 to the position illustrated in FIGURE 16. During this time, the cam follower 224 engages an arm deflecting portion 228 of the cam groove 226 thereby causing the can contacting member 221 to pivot outwardly thereby moving the can C2 substantially off the associated can supporting segment 120a for return to the control of the conveyor 32a. It will be noted that the convex surface 218a (FIG. 14) of the compound curved pocket 214a aids in maintaining the can C2 on the conveyor 32a after the can contacting member 221 returns to its inactive position.

The third embodiment of the invention illustrated in FIGURES 19 to 24 is somewhat similar to the second embodiment of the invention except that the by-passed containers C2, C4 are positively held from arcuate movement with the seamng turret 40b until the containers have been advanced by the conveyor 32b into engagement with a portion of the conveyor guide rails 72b disposed downstream of the turret 40b.

It will be understood that the star wheel 180b and the can dividing wheel 208b (FIG. 20) as well as the pockets therein may be identical to those disclosed in the first embodiment of the invention. However, it will be understood that the compound curved pockets 214 (FIG. 6) of the can divider wheel 208 may be omitted, and that generally semi-circular pockets (not shown) of the same diameter as the star wheel pockets 212 may be substituted therefor.

It will also be understood that the odd numbered cans are transferred onto the can lifting mechanism 44b (FIGS. 19 to 24) and are clamped against the associated seaming heads in exactly the same manner as disclosed in the first embodiment of the invention.

Because of the above similarities, only those parts of the third embodiment of the invention which are different from the first embodiment of the invention will be described in detail. Parts of the third embodiment will be assigned the same numerals as equivalent parts of the first embodiment followed by the letter "b."

As shown in FIGURES 19 and 20, four equally spaced can deflecting fingers 233 are provided for deflecting the evenly numbered cans from their associated can supporting segments 120b. Each finger 233 includes a can deflecting arm 234 pivotally connected at one end to the associated segment 120b by a bolt 236. An elongated slot 238 is formed in the can deflecting arm 234 near the other end thereof and slidably receives a pin 239 therein. The pin 239 is also slidably received in an arcuate slot 241 formed in the can suporting segment 120b. The pin 239 is welded to one end of an arm 242 which is disposed below the segment 120b and is rigidly secured to the upper end of a pivot shaft 243. The pivot shaft 243 is journaled in the skirt 112b and has one end of a lever 244 secured to its lower end. A cam follower 245 is journaled on the other end of the lever and rides in a cam track 246 formed in the face of the cam 108b. It wil be noted that the arm 242, shaft 243, and lever 244 cooperate to define a bell crank.

The can deflecting arm 234 of each finger 233 is normally held in an inactive position away from the associated can as indicated in FIGURE 21. As the evenly numbered cans are moved by the conveyor 32b toward the right as viewed in FIGURES 21 to 24, each evenly numbered can for example can C2, first moves onto the associated can supporting segment 120b and is advanced past the tangent point of the can dividing turret 40b and star wheel 180b by the pusher 62b of the conveyor 32b. Continued movement of the can C2 past the position illustrated in FIGURE 22 causes the cam follower 245 to move into a reduced diameter portion of the cam track 246 thereby causing the can deflecting arm 234 to gently swing outwardly. The arm remains in this position until after can C2 has been advanced by the conveyor 32b a sufficient distance to place the can C2 under the control of the portion of the guide rail 72b disposed downstream of the turret 40b thereby effecting a positive transfer of the can C2 off the segment 120b for movement by the conveyor 32b to the next seaming turret.

From the foregoing description it will be apparent that the container handling system of the present invention utilizes a can dividing mechanism which is formed as a component of the first of a pair of seaming turrets and is effective to cause alternate ones of the containers being handled to be deflected out of a linear path into an arcuate path and to immediately clamp the deflected containers against associated seaming heads thereby assuring complete control of the so deflected containers. The dividing mechanism also includes means for first receiving the other containers on the first seaming turret and for thereafter deflecting those containers off the turret thereby causing them to by-pass the first turret and be returned to the linear path for conveyance to the second seaming turret.

Although the best mode contemplated for carrying out the present invention has been herein shown and described, it will be apparent that modification and variation may be made without departing from what is regarded to be the subject matter of the invention as set forth in the appended claims.

I claim:

1. A container handling apparatus comprising conveying means for advancing a row of containers along a linear path, a turret disposed adjacent the path of movement of said conveying means, a plurality of vertically movable container carriers mounted on said turret for rotation therewith and for movement tangentially into said linear path below selected ones of the containers while in said linear path for supporting the same and moving them out of said linear path, container abutment means carried by said turret for movement tangentially of said linear path and spaced above said container carriers a distance greater than the height of the containers, container supporting means disposed between said carriers and carried by said turret for movement below the non-selected containers of the row of containers, deflecting means carried by the turret and arranged to contact and deflect the non-selected containers from said supporting means and into said linear path downstream of the tangent point, and means for driving said conveying means and turret and for reciprocating said container carriers in timed relation whereby the selected containers are disposed upon said carriers and said carriers are reciprocated vertically for firmly clamping the selected containers between said carriers and said abutment means for positively withdrawing the selected containers from said linear path while said deflecting means maintains the non-selected containers in said linear path.

2. A container handling apparatus comprising conveying means for advancing a row of containers along a linear path, a turret disposed adjacent the path of movement of said conveying means, a plurality of vertically movable container carriers mounted on said turret for rotation therewith and for movement tangentially into said path below selected ones of the containers for supporting the same and moving them out of said linear path, container abutment means carried by said turret and spaced above said container carriers a distance greater than the height of the containers, container supporting means disposed between said carriers and carried by said turret for movement below the non-selected containers of the row of containers, deflecting means carried by the turret and arranged to contact and deflect the non-selected containers from said supporting means and into said linear path downstream of the tangent point, and means for driving said conveying means and turret and for reciprocating said container carriers in timed relation whereby the selected containers are disposed upon said carriers and said carriers are reciprocated vertically to clamp the erected containers against said abutment means as the selected containers are moved out of said linear path while said deflecting means maintains the nonselected containers in said linear path, said deflecting means being a plate having a plurality of evenly spaced small diameter pockets therein for accommodating the selected containers and the plurality of compound curved pockets therein, each compound curved pocket being adapted to engage one of the non-selected containers and after passing the point of tangency with said linear path to cooperate with said conveying means to deflect the container off said container supporting means.

3. An apparatus according to claim 2 wherein each of said compound curved pockets includes a concave portion and a convex portion.

4. An apparatus according to claim 2 wherein said deflecting means includes a plurality of pivotal container fingers, each finger being associated with one of said pockets and being pivotally mounted on said container supporting means, and means for pivoting said finger after said associated compound curved pocket has moved past the point of tangency to cause said finger to force the container out of the compound pocket into said linear path of movement of said conveying means.

5. An apparatus according to claim 4 wherein each of said fingers is actuated by a stationary cam that is concentric with said turret.

6. An apparatus according to claim 2 and additionally comprising a star wheel having a plurality of equally spaced small diameter pockets and a plurality of large diameter pockets in the periphery thereof, said star wheel being disposed adjacent the opposite side of said conveyor means from said turret, and means for driving said star wheel in timed relation with said turret whereby said small diameter pockets of said star wheel cooperate with said small diameter pockets of said deflecting means to accommodate the selected containers at the point of tangency.

7. An apparatus according to claim 6 wherein a plurality of said container abutment means are provided and wherein each container abutment means is concentric with one of said carriers and forms part of a container closing head.

8. A container handling apparatus comprising conveying means for advancing a row of containers along a linear path; a turret disposed adjacent the path of movement of said conveying means; a plurality of vertically movable container carriers mounted on said turret for rotation therewith and for movement tangentially into said path below selected ones of the containers for supporting the same and moving them out of said linear path; container abutment means carried by said turret and spaced above said container carriers a distance greater than the height of said containers; container supporting means disposed between said carriers and carried by said turret for movement below the non-selected containers of the row of containers; deflecting means carried by the turret and arranged to contact and deflect the non-selected containers from said supporting means and into said linear path downstream of the tangent point; means for driving said conveying means and turret and for reciprocating said container carriers in timed relation whereby the selected containers are disposed upon said carriers and said carriers are reciprocated vertically to clamp the selected containers against said abutment means as the selected containers are moved out of said linear path while said deflecting means maintains the non-selected containers in said linear path; said deflecting means being a plate having a plurality of evenly spaced pockets therein; a container deflecting arm associated with each pocket and pivotally mounted on said container supporting means; and means for pivoting said arm outwardly after said arm moves past the tangent point to cooperate with said conveying means to deflect a non-selected container off said supporting means; said arm having an elongated slot therein and said container supporting means having an arcuate slot therein; said means for pivoting said arm including a bell crank journalled on said turret, a pin secured to one end of said bell crank and projecting through said elongated slot and said arcuate slot, a cam follower on the other end of said bell crank, and a cam concentric with said turret and operatively connected to said cam follower for actuating said deflecting container arm.

9. An apparatus according to claim 8 wherein a container guide rail is disposed parallel to said linear path and downstream of the point of tangency, and wherein said arm includes a free end which is pivoted to a point immediately adjacent said guide rail to form an extension thereof and remains adjacent said guide rail until after the deflected container is under complete control of said rail and said conveying means.

10. An apparatus according to claim 9 wherein a plurality of said container abutment means are provided and wherein each container abutment means is concentric with one of said carriers and forms part of a container closing head.

References Cited

UNITED STATES PATENTS

| | | | |
|---|---|---|---|
| 1,326,903 | 1/1920 | Augensen | 198—31 |
| 2,500,465 | 3/1950 | Meyer | 198—22 |
| 2,711,817 | 6/1955 | Hautau et al. | 198—210 |
| 2,835,375 | 5/1958 | McGihon | 198—21 |
| 2,865,158 | 12/1958 | Wakeman | 198—22 X |
| 3,014,574 | 12/1961 | Nussbaum | 198—31 X |

EDWARD A. SROKA, *Primary Examiner.*

EVON C. BLUNK, *Examiner.*

M. L. AGEMAN, *Assistant Examiner.*